United States Patent Office 2,998,460
Patented Aug. 29, 1961

2,998,460
1-TERT.-BUTYL-4-(FLUOROETHYL) BENZENES AND METHOD OF MAKING THE SAME
George A. Olah and Stephen Joseph Kuhn, Sarnia, Ontario, Canada, assignors to The Dow Chemical Company, Midland, Mich., a corporation of Delaware
No Drawing. Filed Jan. 28, 1960, Ser. No. 5,120
3 Claims. (Cl. 260—651)

This invention relates to new alpha- and beta-fluoroethyl alkylbenzenes such as p-tert.-butyl alpha- and beta-fluoroethylbenzenes and a method of making the same.

The new compounds of the invention have the general formula:

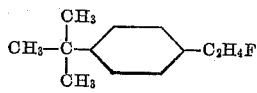

wherein the fluorine atom is attached to the alpha- or beta-carbon atom of the ethyl radical.

The new (fluoroethyl)alkylbenzenes are readily prepared by reacting the corresponding chloro- or (bromoethyl)alkylbenzenes with silver fluoride while having the reactants dispersed or dissolved in a liquid reaction medium such as acetonitrile. The reaction can be carried out at temperatures between about 15 and 75° C. and at atmospheric or substantially atmospheric pressure.

The product is recovered in usual ways such as by filtering the reaction mixture to remove insoluble material and distilling the filtrate to separate and recover the product from the solvent and unreacted material.

The new compounds of the invention inhibit the germination of seeds of noxious plants, e.g. Japanese millet and marigold, and inhibit the growth of and kill specific bacteria and fungus as well as specific insects, being active at relatively low concentrations. The compounds of the invention are also useful as intermediates or starting materials for the preparation of other chemical compounds. For example, the (fluoroethyl)alkylbenzenes can be dehydrohalogenated to produce the corresponding unsaturated hydrocarbon, i.e. p-tert.-butylstyrene.

The following example illustrates practice of the invention, but is not to be construed as limiting its scope.

Example

A solution of 120.5 grams (0.5 mole) of 1-tert.-butyl-4-(2-bromoethyl)benzene in 150 ml. of acetonitrile was added to a mixture of 94 grams of silver fluoride in 300 ml. of acetonitrile in a glass reaction vessel equipped with a reflux condenser and stirrer. The mixture was stirred and maintained at below 50° C. for one hour, then was heated and stirred at 60–65° C. for 0.5 hour to complete the reaction. The mixture was cooled to room temperature and was filtered to remove insoluble material. The filtrate was washed with water and the organic layer separated. It was dried with anhydrous sodium sulfate and was distilled. There was obtained 29 grams of 1-tert.-butyl-4-(2-fluoroethyl)benzene as a colorless liquid boiling at 83–85° C. at 4 millimeters absolute pressure and having a refractive index $n_D^{25}$ 1.4897. Fifty-eight grams of unreacted 1-tert.-butyl-4-(2-bromoethyl)benzene were recovered. The yield of 1-tert.-butyl-4-(2-fluoroethyl)benzene was 63 percent based on the 1-tert.-butyl-4-(2-bromoethyl)benzene consumed in the reaction. The product 1-tert.-butyl-4-(2-fluoroethyl)benzene is a new compound having the structural formula:

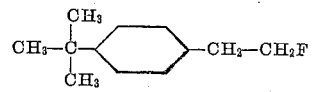

The compound 1-tert.-butyl-4-(1-fluoroethyl)benzene of the formula:

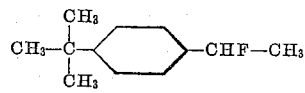

can be prepared in similar manner to that employed for making the 1 - tert. - butyl-4-(2-fluoroethyl)benzene, by using as the starting material 1-tert.-butyl-4-(1-bromoethyl)benzene.

The 1-tert.-butyl-4-(1- and 2-fluoroethyl)benzenes are useful for inhibiting the germinate growth of seeds of marigold and Japanese millet.

When an aqueous spray solution containing 1-tert.-butyl-4-(2-fluoroethyl)benzene in a concentration of 100 parts by weight per million parts of the spray solution was used to wet seeds of marigold the germinate growth was substantially completely inhibited. Similar results are obtained when 1-tert.-butyl-4-(1-fluoroethyl)benzene is tested in the same manner.

We claim:
1. A fluoroethylbenzene selected from the group consisting of 1-tert.-butyl-4-(2-fluoroethyl)benzene and 1-tert.-butyl-4-(1-fluoroethyl)benzene.
2. 1-tert.-butyl-4-(2-fluoroethyl)benzene.
3. 1-tert.-butyl-4-(1-fluoroethyl)benzene.

References Cited in the file of this patent

Beilstein: Organische Chemie, Bond 5, second supplement page 224 (1943).
Knunyants et al.: Chem. Abs. 43, 6164c (1949).